US011217970B2

(12) United States Patent
de Roo et al.

(10) Patent No.: US 11,217,970 B2
(45) Date of Patent: Jan. 4, 2022

(54) MULTIPLE FED BUSBAR SYSTEM

(71) Applicant: ABB Schweiz AG, Baden (CH)

(72) Inventors: Harm de Roo, Singen (DE); Tudor Baiatu, Brugg (CH)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 16/678,455

(22) Filed: Nov. 8, 2019

(65) Prior Publication Data
US 2020/0076170 A1    Mar. 5, 2020

Related U.S. Application Data

(63) Continuation of application No. PCT/EP2018/061838, filed on May 8, 2018.

(51) Int. Cl.
*H02B 1/20* (2006.01)
*H02B 1/056* (2006.01)
*H02B 1/24* (2006.01)
*H02G 5/06* (2006.01)

(52) U.S. Cl.
CPC ............... *H02B 1/20* (2013.01); *H02B 1/056* (2013.01); *H02B 1/24* (2013.01); *H02G 5/06* (2013.01)

(58) Field of Classification Search
None
See application file for complete search history.

(56) References Cited

U.S. PATENT DOCUMENTS

| 6,690,097 | B2 | 2/2004 | Pierrot | |
|---|---|---|---|---|
| 8,547,684 | B2 | 10/2013 | Diaz et al. | |
| 9,379,614 | B2* | 6/2016 | Meinecke | H05K 7/183 |
| 2001/0039133 | A1* | 11/2001 | Pierrot | H02G 5/06 |
| | | | | 439/119 |
| 2006/0067018 | A1* | 3/2006 | Malkowski, Jr. | H02B 11/04 |
| | | | | 361/2 |

(Continued)

FOREIGN PATENT DOCUMENTS

| CN | 1323084 A | 11/2001 |
|---|---|---|
| CN | 102844947 A | 12/2012 |

(Continued)

OTHER PUBLICATIONS

"Low-Voltage switchgear and controlgear assemblies—Part 0: Guidance to specifying assemblies," International Electrotechnical Commission, Technical Report, IEC/TR 61439-0, 66 pp.

(Continued)

*Primary Examiner* — Courtney L Smith
(74) *Attorney, Agent, or Firm* — Greenberg Traurig, LLP

(57) ABSTRACT

A busbar system includes a busbar with at least two parallel arranged phase conductors running between a first end and a second end of the busbar and at least two feeders connected onto the busbar, each feeder including contacts for at least some of the phase conductors of the busbar; a first supply line and a second supply line interconnecting the first feeder and the second feeder with a common power supply; wherein a first feeder of the at least two feeders is connected onto the first end of the busbar and a second feeder of the at least two feeders is connected onto the second end of the busbar; wherein each of the first supply line and the second supply line has a higher impedance than the busbar.

18 Claims, 2 Drawing Sheets

(56) References Cited

U.S. PATENT DOCUMENTS

| | | | | |
|---|---|---|---|---|
| 2009/0109606 A1* | 4/2009 | Brutsch | ............. | H02B 1/056 |
| | | | | 361/648 |
| 2009/0228223 A1* | 9/2009 | Liu | ............. | G01R 31/008 |
| | | | | 702/59 |
| 2011/0136353 A1* | 6/2011 | Spitaels | ............. | H01B 7/30 |
| | | | | 439/95 |
| 2014/0054271 A1* | 2/2014 | Weiden | ............. | H01H 33/022 |
| | | | | 218/153 |
| 2015/0380912 A1* | 12/2015 | Krause | ............. | H02B 11/12 |
| | | | | 361/626 |
| 2016/0261094 A1 | 9/2016 | Admati et al. | | |

FOREIGN PATENT DOCUMENTS

| | | |
|---|---|---|
| CN | 105379036 A | 3/2016 |
| CN | 106300029 A | 1/2017 |
| EP | 1337005 A1 | 8/2003 |
| EP | 1351336 A1 | 10/2003 |
| EP | 3151350 A1 | 4/2017 |
| WO | 2010010120 A1 | 1/2010 |

OTHER PUBLICATIONS

"Low-Voltage switchgear and controlgear assemblies—Part 1: General Rules," International Electrotechnical Commission, Technical Report, IEC/TR 61439-1, 288 pp.

"Low-Voltage switchgear and controlgear assemblies—Part 2: Power switchgear and controlgear assemblies," International Electrotechnical Commission, Technical Report, IEC/TR 61439-2, 50 pp.

"Low-Voltage switchgear and controlgear assemblies—Part 6: Busbar trunking systems (busways)," International Electrotechnical Commission, Technical Report, IEC/TR 61439-6, 90 pp.

European Patent Office, International Search Report & Written Opinion issued in corresponding Application No. PCT/EP2018/061838, dated Jul. 26, 2018, 12 pp.

"Solutions for the Electrical Distribution," Product Brochure, Legrand, Global Specialist in Electrical and Digital Building Infrastructures, Retrieved from the Internet: https://www.legrand/be/sites/default/files/AD-EXLG-CS15C-GB-Busbar-Legrand_BEW_WQ.pdf.

Chinese Patent Office, Office Action issued in corresponding Application No. 201880030778.3, dated May 18, 2020, 17 pp.

* cited by examiner

MULTIPLE FED BUSBAR SYSTEM

FIELD OF THE INVENTION

The invention relates to a busbar system and an electric cabinet with such a busbar system.

BACKGROUND OF THE INVENTION

In electric cabinets, busbars may be used that provide the ability to distribute currents between a power supply and several loads. One or more feeders may be connected to a busbar, which supply the busbar with electrical current. Furthermore, one or more load taps may be connected to the busbar, which receive electrical current and distribute the electrical current to loads electrically interconnected with one or more of the load taps.

The present invention relates to subject matter addressed by the standard IEC-61439.

Feeders of busbars are usually positioned at one end of a busbar or in the middle of the busbar. Such feeders may be used as single feeders or multiple feeders to increase the feeding current to the busbar. However, the disadvantage of using multiple feeders may be that the current carrying capacity of the busbar may have to be increased and/or that load taps may have to be specifically placed on the busbar, such that an overload of the busbar is avoided.

US 2009/109 606 A1 relates to a bus bar block with a feed-in, which is connected to parallel bus bars at a first end and a second end.

US 2001/039 133 A1 relates to an electric power transmission and distribution system. A distribution component is connected at its ends via tab-off devices to a transmission component.

EP 3 151 350 A1 relates to a bus line structure and distribution board. A first horizontal bus bar and a second horizontal bus bar are shown, which are supplied form the same system. Vertical bus bars interconnect the horizontal bus bars.

DESCRIPTION OF THE INVENTION

It is an objective of the invention to provide a busbar system with multiple feeders that is easy to use and that is capable of distributing high currents.

This objective is achieved by the subject-matter of the independent claims. Further exemplary embodiments are evident from the dependent claims and the following description.

An aspect of the invention relates to a busbar system. A busbar system in general may comprise a busbar, the feeders and/or load taps and the electrical lines, which interconnect one or more power supplies with one or more loads.

A further aspect of the invention relates to an electric cabinet comprising the busbar system. For example, the busbar, the feeders and/or load taps may be arranged inside the electric cabinet. Such cabinets may be used in buildings for distributing electrical power. For example, the busbar system may be used in a hospital or a data centre.

For example, the currents distributed by the electrical cabinet and/or the busbar may have a voltage between 10 V and 1000 V and/or a current between 1 A and 1000 A.

According to an embodiment of the invention, the busbar system comprises a busbar with at least two parallel arranged phase conductors running between a first end and a second end of the busbar and at least two feeders connected onto the busbar, each feeder comprising contacts for at least some of the phase conductors of the busbar.

The conductors of the busbar may be metal bars, i.e. metal sheets or metal plates, usually made of copper, which may be mechanically interconnected with each other by a plastics support. This plastics support may be attached to the electric cabinet. It may be that the busbar comprises one one-piece conductor for each phase or that each phase conductor is made of several metal sheets or plates, which are electrically interconnected at their ends. The conductors of the busbar may have a substantially constant cross-section and/or conductivity between their ends.

A feeder may be a device that may be connected onto the busbar for electrically interconnecting a supply line with the busbar. For example, the feeder may comprise a plastics housing, in which the contacts are mechanically supported and/or into which the supply line runs.

In the case of plug-in contacts, the feeder may mechanically connect to the busbar via spring forces of the contacts. Furthermore, the feeder may be attached to the busbar with the aid of screws. A service technician may plug the feeder onto the busbar, which then feeds the busbar with an electrical current from the supply line.

A first feeder of the at least two feeders is connected onto the first end of the busbar and a second feeder of the at least two feeders is connected onto the second end of the busbar.

It may be seen as a gist of the invention, that two feeders are not connected on one end of the busbar or in the middle of the busbar, but on both ends of the busbar. In such a way, load taps may be arranged between the two feeders. In such a way, an increased outgoing current may be available for the load connected to the load tap, without changing the current carrying capability of the busbar. Furthermore, the load tap may be arranged on any position on the busbar, since the impedance of the parts of the busbar between the load tap and the respective feeder is divided according to the position of the load tap. In summary, conducting material for the busbar (such as expensive copper) may be saved and the positioning of the load taps may be facilitated.

It has to be noted that an end of the busbar may be defined by a part of the busbar at an outer end of the phase conductors, which comprise less than 20% of the extension of the busbar and/or the phase conductors.

The busbar system further comprises a first supply line and a second supply line interconnecting the first feeder and the second feeder with a common power supply. Each feeder may be connected to a supply line, which supplies the feeder with electrical current. For example, the supply line may comprise a conductor for each phase of the busbar, which conductor is connected to a respective contact.

The conductors of the first and second supply line may be galvanically interconnected via the common power supply. In a simple case, the common power supply may be a connection to a power supply outside of the electric cabinet, such as an electrical grid. However, the common power supply also may comprise fuses and/or further equipment.

Additionally, each of the first supply line and the second supply line has a higher impedance as the, i.e. than the busbar. The supply lines for the feeders may have an impedance that is higher than the impedance of the busbar. This may mean that each conductor of the respective supply line may have a higher impedance as the respective conductor of the busbar.

For example, the impedance of each supply line may be two times or more higher than the impedance of the busbar. When the conductor impedance between the common power supply and each feeder is substantially larger than the busbar impedance, an overload of the busbar and/or the feeders may be avoided.

According to an embodiment of the invention, the common power supply comprises a short-circuit protection device. A short-circuit protection device may detect a short-circuit and in the case may disconnect the feeders from the power supply. The first and second feeder may be connected and/or protected by the same short-circuit protection device.

According to an embodiment of the invention, the first supply line and the second supply line have the same impedance. The impedance of the first supply line or of its conductors may be equal to the impedance of the second supply line or of its conductors. It has to be noted that equal in this context may mean that the impedances do not differ from each other by more than 10%. Such an equal impedance may be achieved by using equally long supply lines. For example, the first supply line and the second supply line (as well as the other supply lines mentioned below) may have equal length. By controlling the current distribution between the feeders in this way, the available outgoing load currents may be multiplied without the need of increasing the conductivity, i.e. the cross-section of the busbar.

According to an embodiment of the invention, the contacts, i.e. the connection points of the feeder to the busbar, comprises at least one of a plug-in contact, a bolt-on contact and a screw-in contact. The feeder may be plugged, stuck and/or screwed onto the busbar.

In general, the busbar system may contain one or more phase conductors, usually named L1, L2, L3, and optionally a neutral conductor, usually named N, and/or a protective conductor, usually named PE. The busbar system may be suitable for all types of grid configurations, such as TN-S, TN-C, TN-S-C, TT, TT.

According to an embodiment of the invention, the busbar comprises two, three or more phase conductors. The feeders may comprise a contact for each phase conductor of the busbar. Also the supply lines may comprise three phase conductors.

According to an embodiment of the invention, the busbar comprises at least one of a neutral conductor and a protective conductor. The protective conductor may be an earthing conductor. The feeders may also comprise a contact for the neutral conductor and/or the protective conductor of the busbar. Also the supply lines may comprise such conductors.

According to an embodiment of the invention, the busbar comprises at least one of three phase conductors and at least one neutral conductor. Furthermore, the busbar may comprise at least one additional protective conductor.

According to an embodiment of the invention, the busbar system further comprises at least one third feeder connected onto the busbar between the first and second feeder. Optionally, additional feeders may be placed between the two end feeders, optionally applying the same impedance control as described. These feeders may be designed like the first or second feeder. All feeders may be equally designed.

According to an embodiment of the invention, the third feeder is connected with a third supply line with a common power supply of the feeders. This supply line may be designed like the first and second supply line of the first and second feeder.

According to an embodiment of the invention, the third supply line has a higher impedance as/than the busbar and/or has the same impedance as the first and second supply line. In such a way, the above mentioned advantages of overload protection and even current distribution also may be provided for the third feeder.

According to an embodiment of the invention, more than three feeders are connected onto the busbar, wherein each feeder is connected with a supply line with a common power supply of the feeders. Each of the supply lines may has a higher impedance as/than the busbar and/or the supply lines may have the same impedance. In other words, further feeders designed and/or interconnected as the third feeder mentioned above may be connected between the first and second feeder.

According to an embodiment of the invention, the busbar system further comprises at least one load tap for supplying an electrical load, each load tap being connected onto the busbar and each load tap comprising contacts for at least some of the phase conductors of the busbar.

As already mentioned, loads may be interconnected with the busbar with load taps connected onto the busbar. These load taps, like the feeders, may comprise a plastics housing supporting the contacts and/or also may be attached to the busbars with the aid of screws.

The load taps may be adapted for being connected and/or for being disconnected from the busbar, when the busbar system is under power, i.e. when the busbar is supplied with current from the feeders. In such a way, a service technician may disconnect loads and/or may connect additional loads without the need for shutting down all loads connected to the busbar.

The at least one load tap may be arranged between the first feeder and the second feeder. In such a way, the current to the load may be distributed between the first feeder and the second feeder as described above. For example, one or more load tap may be arranged in the middle of the busbar. The middle of the busbar may be a middle part of the busbar, which comprises less than 20% of the extension of the busbar and/or its phase conductors.

In the case of three or more feeders, one or more load taps may be arranged between two feeders, for example between the first feeder or the second feeder at an end of the busbar and a middle feeder between the first and second feeder. In such a way, current from more than two feeders may be distributed to more than one load with only one busbar.

These and other aspects of the invention will be apparent from and elucidated with reference to the embodiments described hereinafter.

BRIEF DESCRIPTION OF THE DRAWINGS

The subject-matter of the invention will be explained in more detail in the following text with reference to exemplary embodiments which are illustrated in the attached drawings.

The reference symbols used in the drawings, and their meanings, are listed in summary form in the list of reference symbols. In principle, identical parts are provided with the same reference symbols in the figures.

DETAILED DESCRIPTION OF EXEMPLARY EMBODIMENTS

Figure 1:
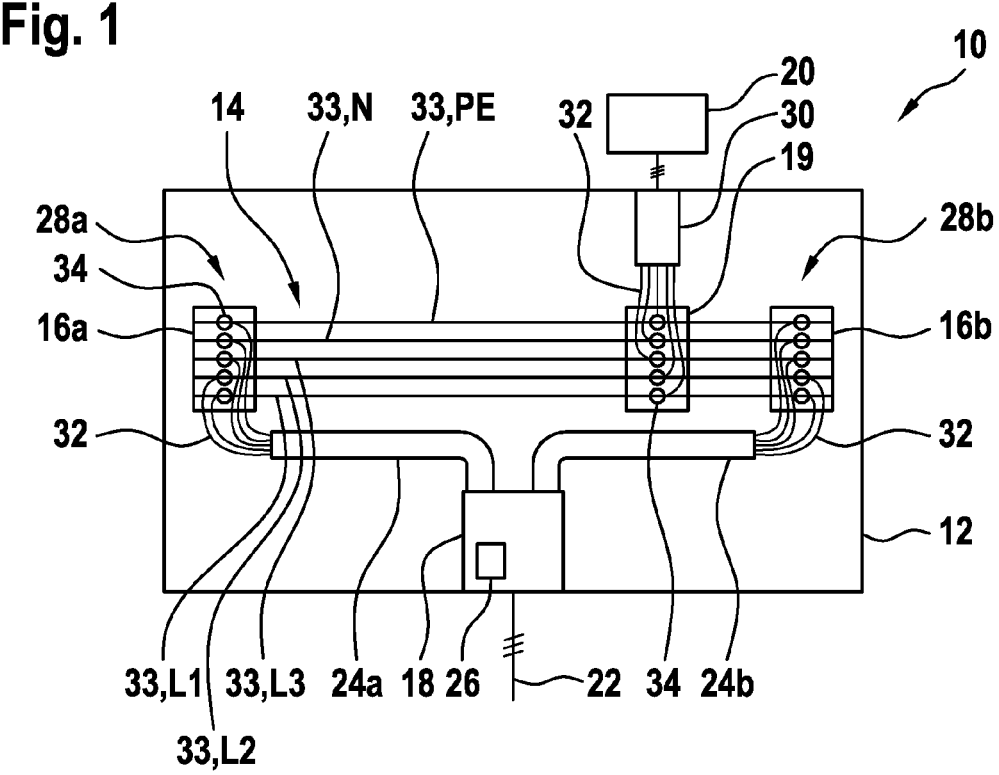
FIG. 1 schematically shows a busbar system according to an embodiment of the invention.

FIG. 1 shows a busbar system 10 that is accommodated in an electric cabinet 12. The busbar system comprises a busbar 14, two feeders 16a, 16b, a common power supply 18 for the feeders 16a, 16b and a load tap 19, for supplying an electrical load 20.

The power supply 18 may be connected with an electrical grid 22, which for example may be a wide area network grid. The current from the grid 22 may enter the electric cabinet via a gridline, which is connected with the power supply 18. The electric cabinet 12 may be accommodated in a building, such as a hospital or data centre and the busbar system 10 may be used for distributing electrical currents from the grid 22 to one or more loads 20.

The feeders 16a, 16b are connected onto the busbar 14 and are electrically connected with it. Both feeders 16a, 16b are interconnected with the common power supply 18 via supply lines 24a, 24b. The current from the common power supply 18, which also may comprise a short-circuit protection device 26, is distributed among the feeders and supplied into the busbar 14. Since the feeders 16a, 16b are arranged at ends 28a, 28b of the busbar 14, the current is introduced into the busbar 14 at these ends 28a. 28b.

The load tap 19, which may be designed like a feeder 16a, 16b, also is connected onto the busbar 14 and electrically connected with it. The current in the busbar is supplied by the load tap 19 into a further supply line 30, which may be designed like the supply lines 24a, 24b. This supply line 30 may leave the electric cabinet 12 and may supply the load 20 with current.

Since the current is fed into the ends 28a, 28b of the busbar 14, both parts of the busbar 14 between a feeder 16a, 16b and the connection position of the load tap 19 with the busbar 14 may be used for conducting current. Thus, the busbar 14 may conduct twice as much power compared to the case, where the load tap 19 is connected outside of the feeders 16a, 16b with the busbar 14.

The supply lines 24a, 24b may be designed such that they have (nearly) equal impedance and a higher impedance as the busbar 14. In such a way, the current is evenly distributed between the feeders 16a, 16b and the feeders as well as the busbar 14 may be protected for overcurrent.

The busbar system 10 is a multi-phase system. The busbar 14, the supply lines 24a, 24b, 30, the feeders 16a, 16b and the load tap 19 comprises several phases. For example, the busbar 14 comprises three phase conductors L1, L2, L3 and optionally a neutral conductor N and/or a protective conductor PE. All conductors 33 of the busbar 14, i.e. L1, L2, L3, N, PE, may be a bar, for example made of a metal plate or metal sheet.

Also the supply lines 24a, 24b, 30 may comprise corresponding conductors 32, which, however, may be strands of the supply lines 24a, 24b, 30.

Each of the feeders 16a, 16b and the load tap 19 comprises a contact 34 for each conductor 33 of the busbar 14. When a feeder 16a, 16b is connected onto the busbar 14, the respective contact 34 is connected onto the respective conductor 33 of the busbar 14. For example, each contact 34 comprises a spring element, which clamps onto the respective conductor 33.

Figure 2:
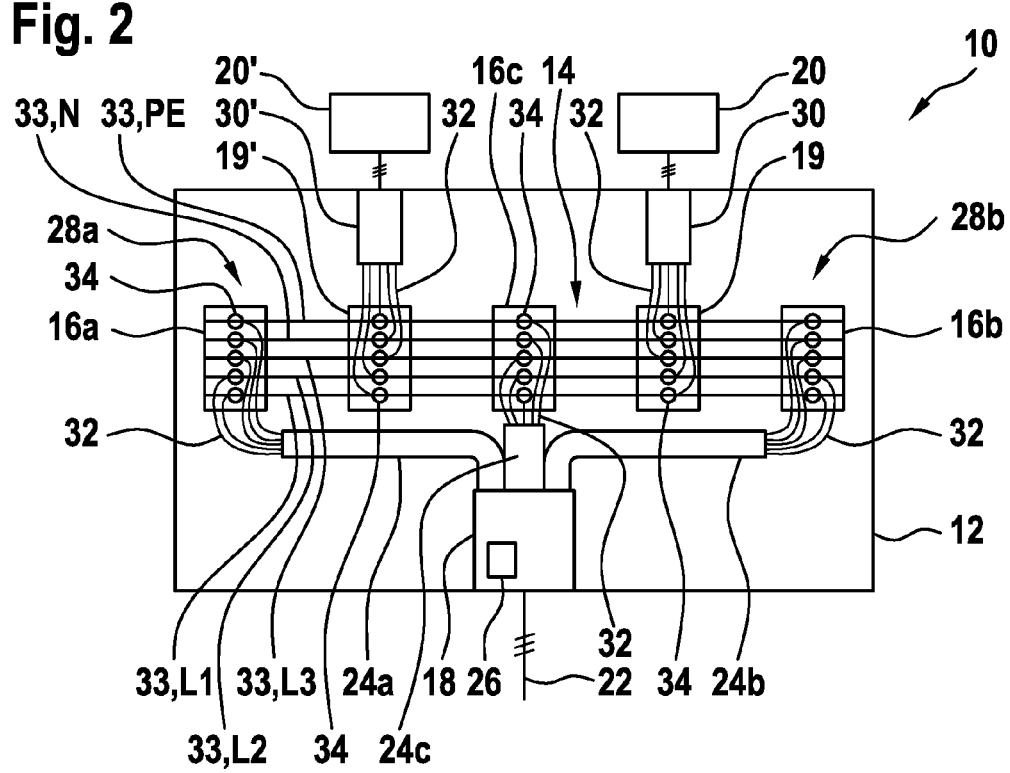
FIG. 2 schematically shows a busbar system according to a further embodiment of the invention.

FIG. 2 shows a busbar system 10, which comprises an additional feeder 16c in the middle of the busbar 14 and an additional load tap 19'. The feeder 16c may be designed like the feeders 16a, 16b. The load tap 19', which may be designed like the load tap 19, may be interconnected with a further supply line 30', which may supply a further load 20' with current from the busbar 14.

The feeder 16c, like the feeders 16a, 16b, is supplied from the common power supply 18 via a supply line 24c, which may be designed like the ones of the feeders 16a, 16b. I.e. also the supply line 24c may have an impedance equal to the ones of the supply lines 24a, 24b and higher than the impedance of the busbar 14.

The load tap 19 is positioned between the feeder 16b and the feeder 16c. The load tap 19' is positioned between the feeder 16b and the feeder 16c. In such a way, the current from the common power supply may be distributed among the loads 20, 20' via the parts of the busbar 14 on both sides of the load taps 19, 19'.

Figure 3:
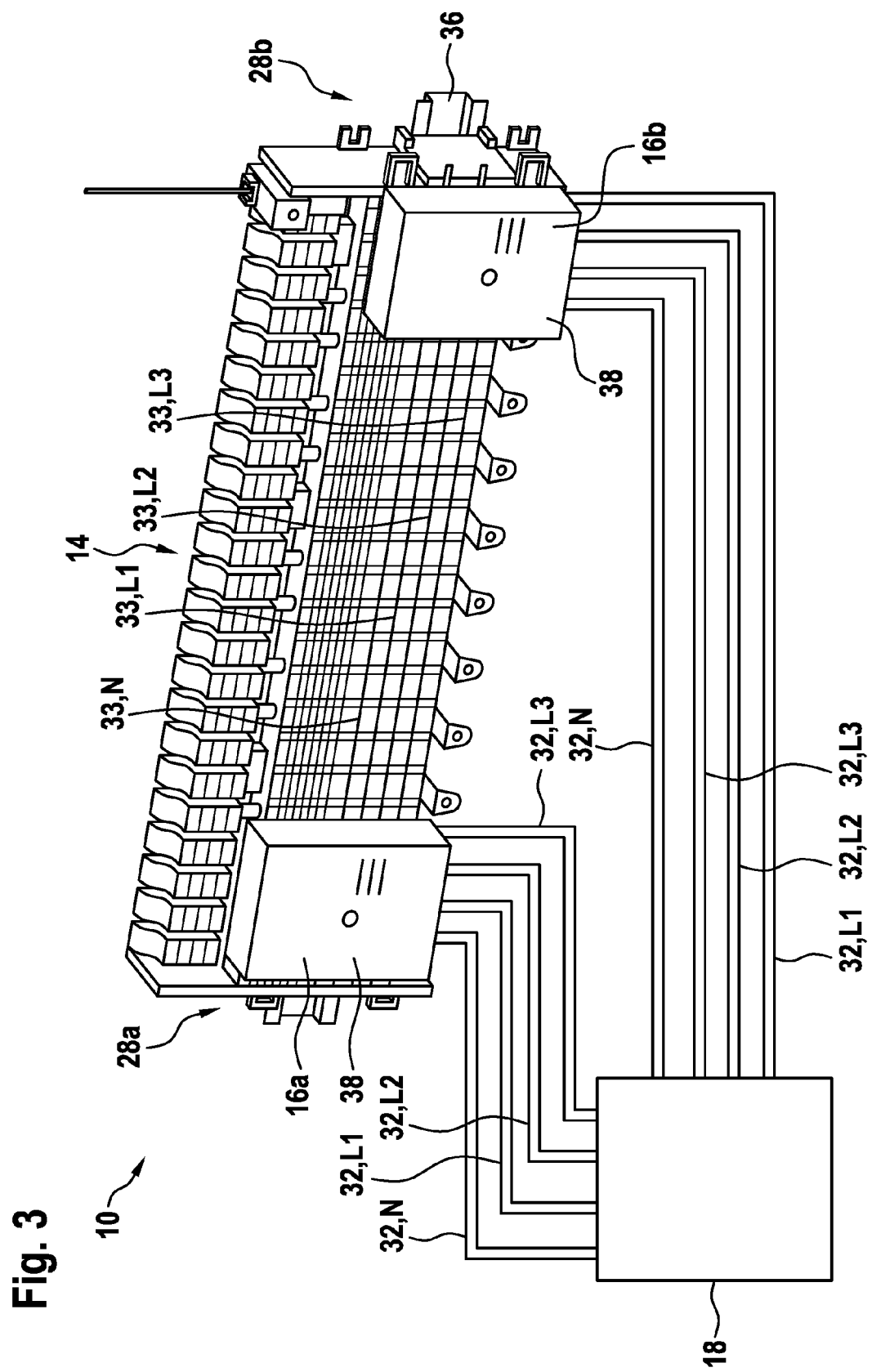
FIG. 3 schematically shows a busbar system according to a further embodiment of the invention.

FIG. 3 shows a busbar system 10, with two feeders 16a, 16b at ends of a busbar 14. The conductors 33 of the busbar 14, i.e. L1, L2, L3, N, PE, may be provided by bars, such as metal plates or metal sheets that protrude from a plastics support 36 of the busbar 14. The plastics support 36 may be attached to the electric cabinet 12.

Each of the feeders 16a, 16b may comprise a plastics housing 38, which accommodates the contacts 34 and an end of the corresponding supply line 36a, 36b. However, in FIG. 3, only the conductors 32 of the supply lines are schematically shown.

Although not shown in FIG. 3, the load taps 19, 19' may be designed like the feeders 16a, 16b in FIG. 3.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art and practising the claimed invention, from a study of the drawings, the disclosure, and the appended claims. In the claims, the word "comprising" does not exclude other elements or steps, and the indefinite article "a" or "an" does not exclude a plurality. A single processor or controller or other unit may fulfil the functions of several items recited in the claims. The mere fact that certain measures are recited in mutually different dependent claims does not indicate that a combination of these measures cannot be used to advantage. Any reference signs in the claims should not be construed as limiting the scope.

LIST OF REFERENCE SYMBOLS 10 busbar system
12 electric cabinet
14 busbar
16a first feeder
16b second feeder
16c third feeder
18 common power supply
19 first load tap
19' first load tap
20 first electrical load
20' second electrical load
22 electrical grid
24a first supply line
24b second supply line
24c third supply line
26 short-circuit protection device
28a first end of busbar
28b second end of busbar
30 first load supply line
30' second load supply line
32 conductor, strand of the supply line
33 conductor, bar of busbar
L1 phase conductor
L2 phase conductor
L3 phase conductor N neutral conductor
PE protective and/or earthing conductor
34 contact
36 plastics support
38 plastics housing

The invention claimed is:

1. A busbar system, comprising:
    a busbar with at least two parallel arranged phase conductors running between a first end and a second end of the busbar;
    at least two feeders connected onto the busbar, each feeder comprising contacts for at least some of the phase conductors of the busbar;
    at least one third feeder connected onto the busbar between the first and second feeder;
    a first supply line and a second supply line interconnecting the first feeder and the second feeder with a common power supply;
    wherein a first feeder of the at least two feeders is connected onto the first end of the busbar and a second feeder of the at least two feeders is connected onto the second end of the busbar;
    wherein each of the first supply line and the second supply line has a higher impedance than the busbar.

2. The busbar system of claim 1, wherein the common power supply comprises a short-circuit protection device.

3. The busbar system of claim 1, wherein the first supply line and the second supply line have the same impedance.

4. The busbar system of claim 1, wherein the contacts comprises at least one of a plug-in contact, a bolt-on contact and a screw-in contact.

5. The busbar system of claim 1, wherein the busbar comprises two, three or more phase conductors.

6. The busbar system of claim 1, wherein the busbar comprises at least one of three phase conductors and at least one neutral conductor.

7. The busbar system of claim 1, wherein the busbar comprises at least one additional protective conductor.

8. The busbar system of claim 1, wherein the third feeder is connected with a third supply line with the common power supply of the feeders.

9. The busbar system of claim 8, wherein the third supply line has a higher impedance than the busbar.

10. The busbar system of claim 8, wherein the third supply line has the same impedance as supply lines of the first feeder and the second feeder.

11. The busbar system of claim 1, wherein more than three feeders are connected onto the busbar, wherein each feeder is connected with a further supply line with the common power supply of the feeders;
    wherein each of the further supply lines has a higher impedance than the busbar and/or the further supply lines have the same impedance.

12. The busbar system of claim 1, further comprising:
    at least one load tap for supplying an electrical load, each load tap being connected onto the busbar and each load tap comprising contacts for at least some of the phase conductors of the busbar;
    wherein the at least one load tap is arranged between the first feeder and the second feeder.

13. An electric cabinet comprising the busbar system according to claim 1.

14. The busbar system of claim 9, wherein the third supply line has the same impedance as supply lines of the first feeder and the second feeder.

15. The busbar system of claim 2, wherein the first supply line and the second supply line have the same impedance.

16. The busbar system of claim 15, wherein the contacts comprises at least one of a plug-in contact, a bolt-on contact and a screw-in contact.

17. The busbar system of claim 16, wherein the busbar comprises at least one of three phase conductors and at least one neutral conductor.

18. The busbar system of claim 17, wherein the busbar comprises at least one additional protective conductor.

* * * * *